United States Patent
Maeda et al.

(10) Patent No.: US 8,253,885 B2
(45) Date of Patent: Aug. 28, 2012

(54) LIQUID CRYSTAL DISPLAY DEVICE, BACKLIGHT SOURCE AND OPTICAL FILM

(75) Inventors: Tsuyoshi Maeda, Yamanashi (JP); Toyokazu Ogasawara, Kanagawa (JP)

(73) Assignee: Sony Corporation, Tokyo (JP)

(*) Notice: Subject to any disclaimer, the term of this patent is extended or adjusted under 35 U.S.C. 154(b) by 229 days.

(21) Appl. No.: 12/416,257

(22) Filed: Apr. 1, 2009

(65) Prior Publication Data
US 2009/0251636 A1 Oct. 8, 2009

(30) Foreign Application Priority Data
Apr. 4, 2008 (JP) .................. P2008-098611

(51) Int. Cl.
G02F 1/1335 (2006.01)
A47F 3/00 (2006.01)
F21V 7/04 (2006.01)
H03H 9/00 (2006.01)
(52) U.S. Cl. .................. 349/64; 349/106; 362/561
(58) Field of Classification Search .................. 349/64, 349/63, 106; 362/561
See application file for complete search history.

(56) References Cited

U.S. PATENT DOCUMENTS

| | | | | |
|---|---|---|---|---|
| 6,147,740 A * | 11/2000 | Yoshida et al. | | 349/165 |
| 6,246,506 B1 * | 6/2001 | Kobayashi et al. | | 359/246 |
| 2006/0291236 A1 * | 12/2006 | Hsu et al. | | 362/561 |
| 2008/0297530 A1 * | 12/2008 | Ramstad | | 345/589 |

FOREIGN PATENT DOCUMENTS
JP 10-293299 11/1998
* cited by examiner

Primary Examiner — Mark Robinson
Assistant Examiner — Robert Tavlykaev
(74) Attorney, Agent, or Firm — Finnegan, Henderson, Farabow, Garrett & Dunner, L.L.P.

(57) ABSTRACT

A liquid crystal display device according to the present invention includes a liquid crystal panel, a backlight source provided on a rear surface of the liquid crystal panel, for irradiating the liquid crystal panel with white light, and an optical film provided between the liquid crystal panel and the backlight source, in which the optical film includes a base material which passes the white light irradiated from the backlight source, a colored layer partially provided on one surface of the base material at the side of the liquid crystal, panel, and a reflective layer provided on another surface of the base material at the side of the backlight source opposite to the colored layer, for reflecting the white light.

12 Claims, 11 Drawing Sheets

LIQUID CRYSTAL DISPLAY DEVICE, BACKLIGHT SOURCE AND OPTICAL FILM

BACKGROUND OF THE INVENTION

1. Field of the Invention

The present invention relates to a liquid crystal display device, a backlight source and an optical film.

2. Description of the Related Art

Liquid crystal display devices are in widespread use for monitors of a personal computer and a portable device and a television because of various advantages that they realize low voltage and low power consumption and they can be formed into a thinner film, downsized, or large-screen design. Such a liquid crystal display device has been provided in various modes according to the arrangement state of liquid crystals of a liquid crystal substance layer, for example, a TN (Twisted Nematic) mode, an IPS (In-Plane Switching) mode, an OCB (Optically Compensatory Bend) mode, a VA (Vertically Aligned: vertical orientation) mode. Especially a liquid crystal of the VA mode, of the above modes, has attracted attentions in recent years because of its high contrast capability.

This liquid crystal, however, has an issue that the hue in the ease of observing the liquid crystal from a normal direction is different from the hue in the case of observing it from a wide-angle direction in white display.

In Japanese Patent Application Laid-Open No. 10-293299, a hue change observed from the wide-angle direction in the white display is compensated by providing a sheet containing dichroic dyes between a liquid crystal panel and a backlight source.

SUMMARY OF THE INVENTION

The sheet containing dichroic dyes disclosed in Japanese Patent Application Laid-Open No. 10-293299, however, needs to be formed while performing an orientation control on the both dichroic dyes and liquid crystal molecules, which makes its manufacture difficult.

The present invention has been made in views of such issues, and it is desirable to provide a new and improved liquid crystal display device, backlight source, and optical film which can restrain a hue change observed from the wide-angle in white display and can be manufactured easily.

According to an embodiment of the present invention, there is provided a liquid crystal display device including a liquid crystal panel; a backlight source which irradiates the liquid crystal panel with white light, provided in a rear side of the liquid crystal panel; and an optical film which is provided between the liquid crystal panel and the backlight source, in which the optical film includes a base material which passes the white light irradiated from the backlight source, a colored layer which is partially provided on one surface of the base material at the side of the liquid crystal panel, and a reflective layer which reflects the white light, provided on another surface of the base material at the side of the backlight source opposite to the colored layer.

The area of a part of the base material with the colored layer formed may he smaller than that of a part with no colored layer formed.

The area of a part of the base material with the reflective layer formed may he smaller than that of a part with no reflective layer formed.

The area of the part of the base material with the colored layer formed may he smaller than that of the part of the base material with the reflective layer formed.

The colored layer may be formed of a chemical compound having the maximum absorption wavelength in a visible light region of 580 nm and more.

A plurality of the colored layers may be provided like islands with each of them in a schematically rectangular shape, and a plurality of the reflective layers may be provided like islands with each of them in a schematically circular shape larger than the corresponding colored layer.

The colored layer and the reflective layer may be provided on the base material in a grid shape. The colored layer and the reflective layer may be formed in a grid shape oblique to each edge side of the base material. The colored layer and the reflective layer may be provided on the base material in a stripe shape.

It is preferable that a scattering member which scatters the light passing through the optical film does not exist between the optical film and the liquid crystal panel.

According to another embodiment of the present invention, there is provided a backlight source assembly including: a backlight source which emits white light; and an optical film which is arranged on the backlight source, in which the optical film includes a base material which passes the white light emitted from the backlight source, a reflective layer which reflects the white light, partially provided on one surface of the base material at a side of the backlight source, and a colored layer which is provided on another surface opposite to the side of the backlight source, in a way of facing the reflective layer.

According to further another embodiment of the present invention, there is provided an optical film including: a base material which passes white light; a reflective layer which reflects the white light, partially provided on one surface of the base material; and a colored layer which is provided on another surface of the base material opposite to the reflective layer.

According to the embodiments of the present invention described above, it is possible to control a hue change observed from the wide-angle in the white display.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and configuration are denoted with the same reference numerals, and repeated explanation of these structural elements is omitted.

<Definition of Coordinate System>

Figure 10:
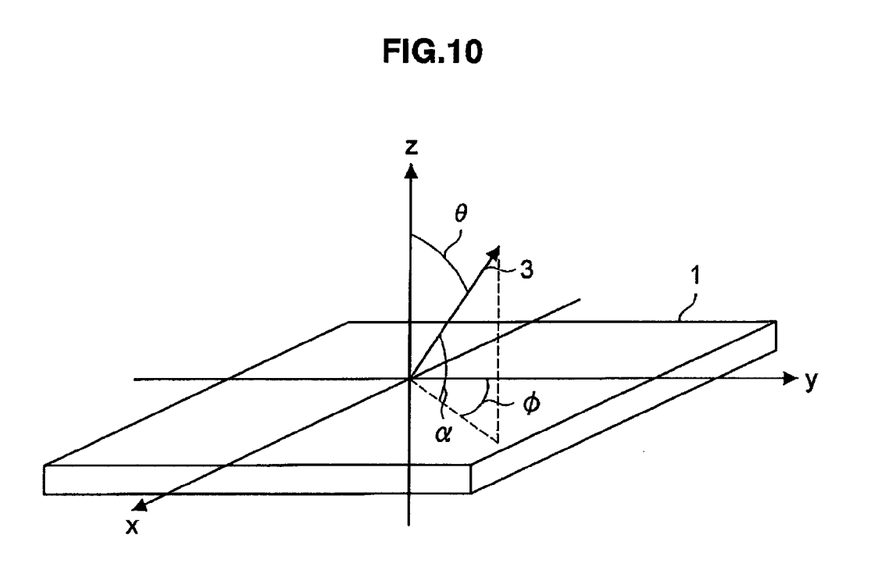
FIG. 10 is a view for explaining definition of a coordinate system.

At first, definition of a coordinate system for use in this specification will be described. In this specification, a coordinate system as shown in FIG. 10 is adopted with a plane surface of a certain substrate 1 as an xy-plane and a vertical direction of the substrate 1 as a z-axis direction. When a certain vector 3 is defined, an angle θ formed by the vector 3 and the z-axis is defined as a polar angle and an angle φ formed by a projection on the xy-plane of the vector 3 and the y-axis is defined as an azimuth. Here, the direction of the vector 3 in FIG. 10 is for convenience in description and it may be from the positive side of the z-axis to the negative side or from the negative side of the z-axis to the positive side. Here, the vector 3 may have a direction of longitudinal axis of molecule of a liquid crystal substance and a pigment or it may have a direction of view when obliquely seeing at the liquid crystal display device with the substrate 1 as the display surface of the liquid crystal display device.

<Liquid Crystal Display Device in Related Art>

Figure 11:
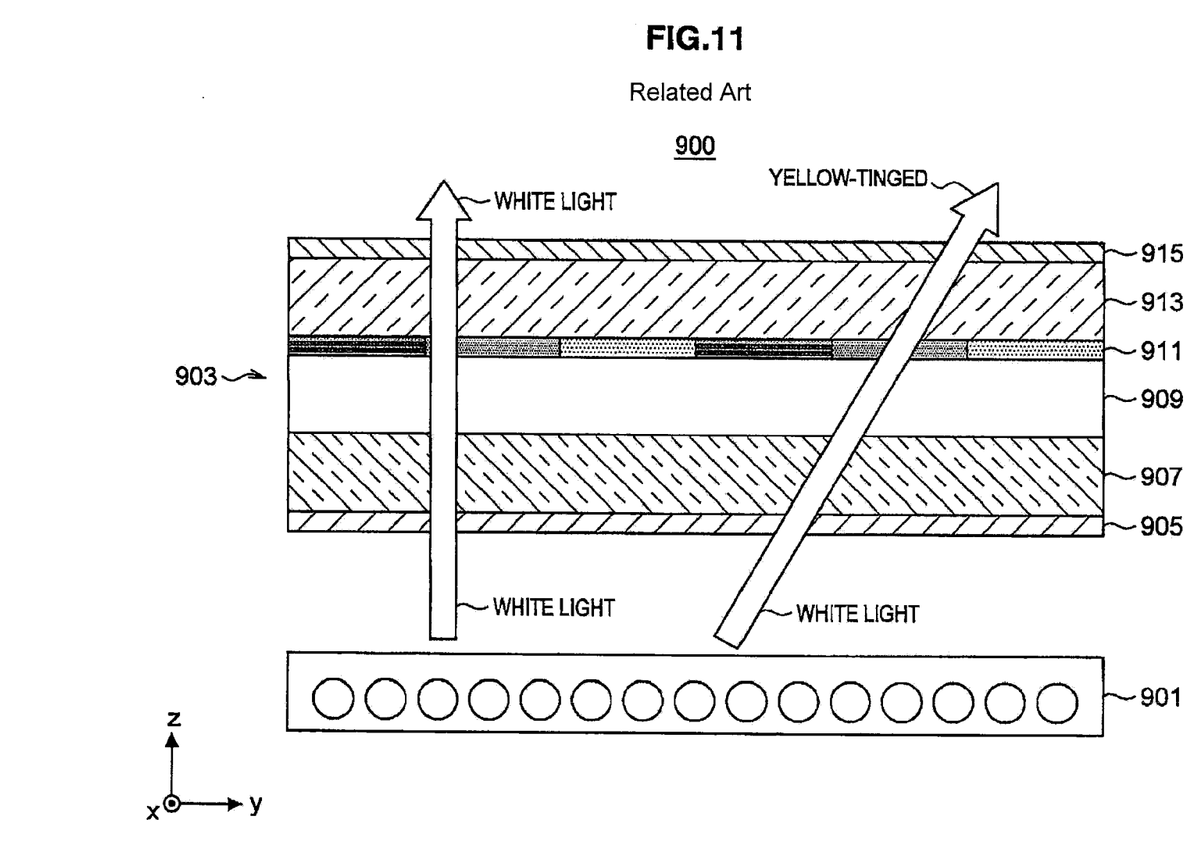
FIG. 11 is a view for explaining a liquid crystal display device in related art.

Prior to the description of the liquid crystal display device according to the first embodiment of the present invention, drawbacks of the liquid crystal display device in related art will he described in detail with reference to FIG. 11 to FIG. 13. FIG. 11 is a view for explaining a hue change in the liquid crystal display device in related art.

The liquid crystal display device 900 in related art mainly includes, for example, a backlight source 901 and a liquid crystal panel 903, as shown in FIG. 11.

The backlight, source 901 is an irradiating unit which irradiates the liquid crystal panel 903 described later, for example, with white light.

The liquid crystal panel 903 controls transmission/shielding of the light irradiated from the backlight source 901 according to the on/off voltage applied to an electrode (not illustrated) provided in the liquid crystal panel 903. As shown in FIG. 11, the liquid crystal panel 903 includes polarization films 905 and 915, glass substrates 907 and 913, a liquid crystal substance layer 909, and an optical filter 911. The liquid crystal panel 903 has pixels aligned flatly and electrodes (not illustrated) for applying a predetermined voltage to the respective pixels.

The liquid crystal display device 900 in related art as shown in FIG. 11 has such an issue that a white light entering the liquid crystal panel 903 vertically passes through the liquid crystal panel 903 as the white light, but a white light entering the liquid crystal panel 903 obliquely is tinged with yellow after passing through the liquid crystal panel 903.

The above-mentioned issue will be described more specifically with reference to FIG. 12. FIG. 12 is a graph for explaining a polar angle dependency of hue in the liquid crystal display device in related art.

Figure 12:
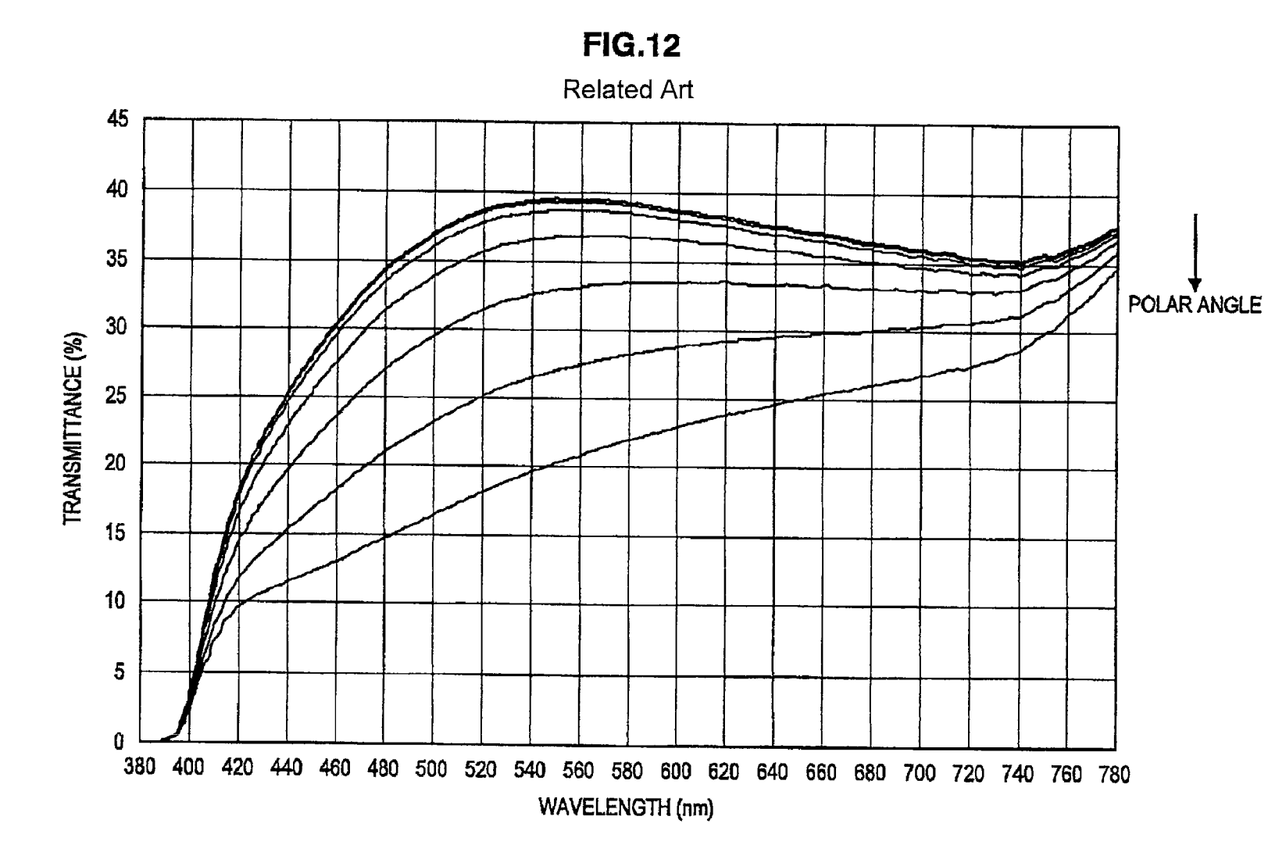
FIG. 12 is a graph for explaining polar angle dependency of hue in the liquid crystal display device in related art.
Figure 13:
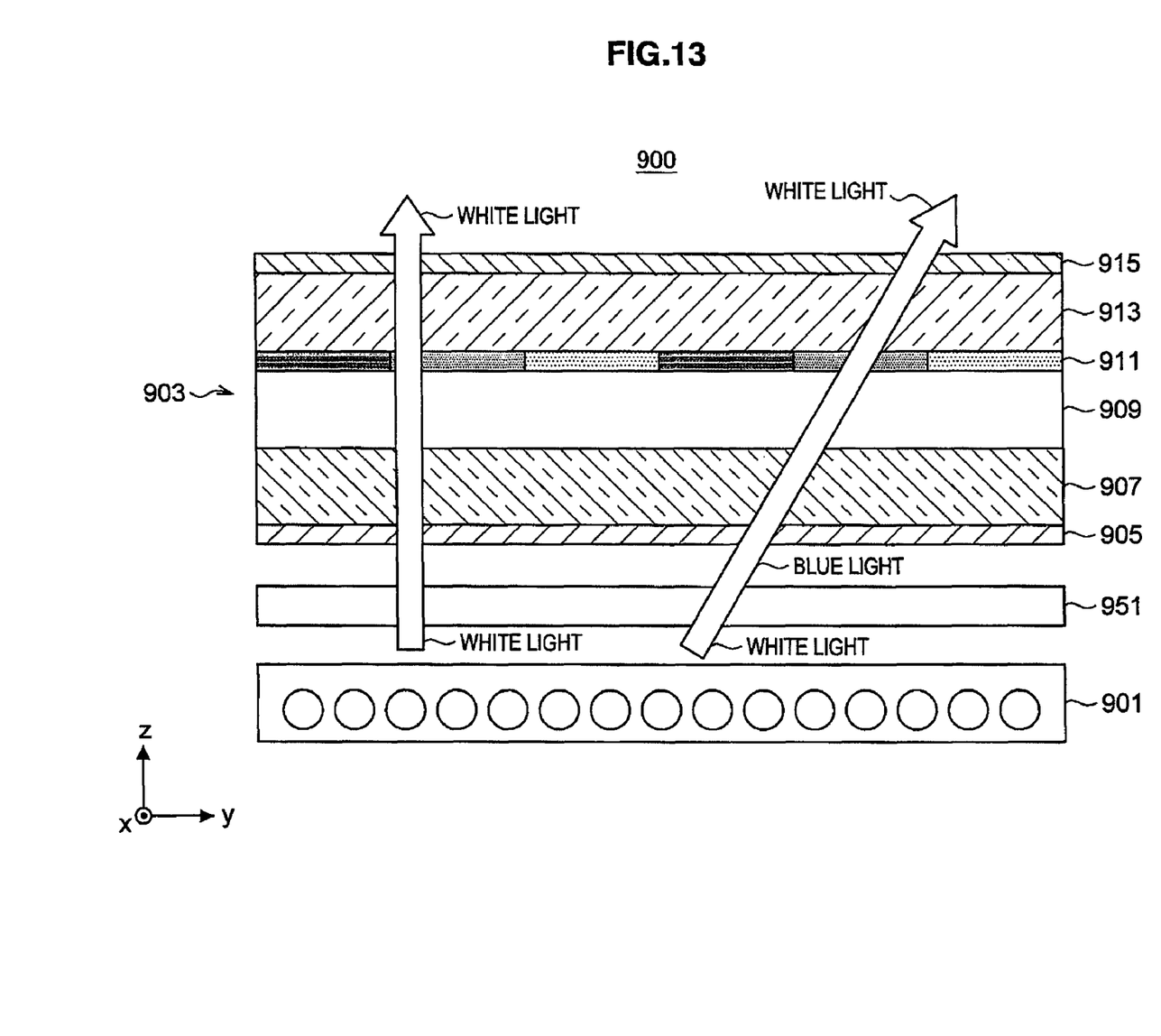
FIG. 13 is a view for explaining the liquid crystal display device in related art.

FIG. 12 is a spectrum of white display when seeing at the liquid crystal display device obliquely from the azimuth φ=45° in the case where the display surface of the liquid crystal display device of a vertical alignment liquid crystal mode (VA mode) with a pixel divided into four domains is defined as the substrate 1 in FIG. 10 and the direction of view is defined as the vector 3 in FIG. 10. The horizontal axis of FIG. 12 shows wavelength and the vertical axis of FIG. 12 shows transmittance. In the spectrum shown in FIG. 12, an angle formed by the direction of view and the normal direction of the liquid crystal display device (that is, the polar angle θ) is changed from 0° to 60° for every ten degrees, to perform the measurement. The spectrum when the angle θ is 0° almost agrees with the spectrum when the angle θ is 10° with little difference in the spectrum.

With reference to FIG. 12, it is found that the transmittance of the blue-color wavelength band is more reduced according as the polar angle θ gets larger and a yellow tinge gets stronger. This tendency is remarkable in the spectrum of the polar angle θ of 50°. The result indicates that even in the case of white display, an observer may recognize it as the image tinged with yellow when he or she observes the liquid crystal display device of the vertical alignment liquid crystal mode from the wide-angle, in other words, that there occurs a hue change when the liquid crystal display device is observed from the wide-angle.

In order to solve such issues, according to the liquid crystal display device described in the above Patent document 1, a sheet 951 including dichroic dyes is arranged between the backlight source 901 and the liquid crystal panel 903. By arranging the sheet 951 therebetween, a white light entering the sheet 951 vertically passes through the liquid crystal panel 903 as the white light, while a white light entering the sheet 951 obliquely becomes blue light through the dichroic dyes included in the sheet 951. Therefore, the blue light entering the liquid crystal panel 903 gets white and comes out from the liquid crystal panel 903 as a white light.

Though the above-mentioned sheet 951 containing the dichroic dyes can be manufactured, for example, with the dichroic dyes and liquid crystal molecules, it is necessary to control the orientation of the dichroic dyes and liquid crystal molecules in its manufacture, which makes it difficult to manufacture the sheet 951.

The inventors of the present invention have made intensive studies to overcome the issue and come to invention a liquid crystal display device, a backlight source, and an optical film described below.

First Embodiment

<Configuration of Liquid Crystal Display Device>

Figure 1:
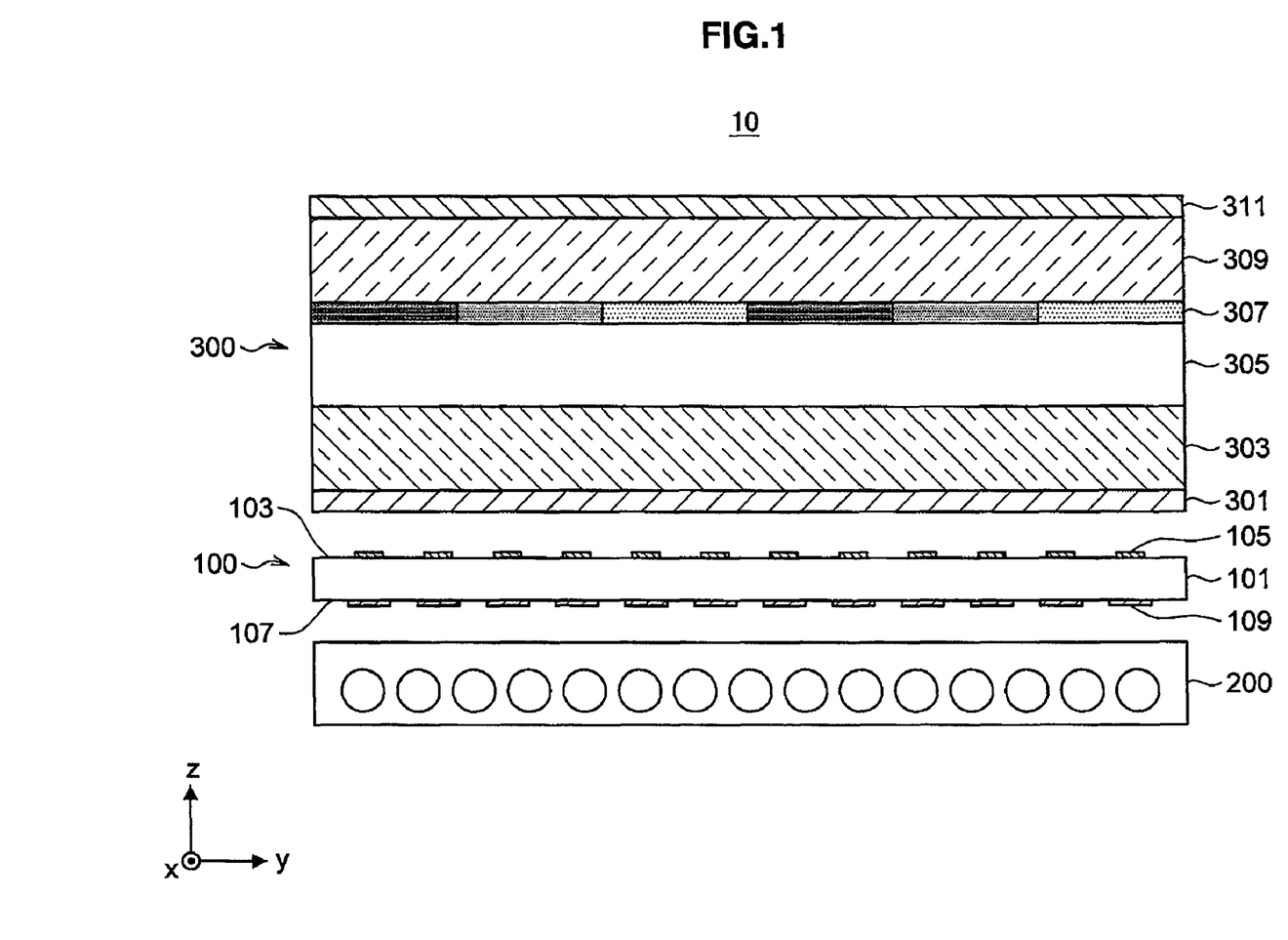
FIG. 1 is a view for explaining a liquid crystal display device according to a first embodiment of the invention.

At first, referring to FIG. 1, a liquid crystal display device according to the first embodiment of the present invention will be described in detail. FIG. 1 is a view for explaining the liquid crystal display device according to the embodiment of the invention.

As shown in FIG. 1, the liquid crystal display device 10 according to the embodiment mainly includes an optical film 100, a backlight source 200, and a liquid crystal panel 300.

The optical film 100 is a member arranged between the backlight source 200 and the liquid crystal panel 300 described later. The optical film 100 absorbs a part of a white light supplied from the backlight source 200, and the partially absorbed white light is transmitted to the liquid crystal panel 300 arranged above the upper surface of the optical film 100. The optical film 100 will be hereinafter described in detail.

The backlight source 200 is an irradiating unit which irradiates the optical film 100 and the liquid crystal panel 300, for example, with the white light. The backlight source 200 according to the embodiment may use a cold-cathode fluorescent lamp (CCFL), a flat fluorescent lamp (FFL), an electro luminescence (EL) element, and a light emitting diode (LED). The backlight source 200 according to the embodiment is not limited to the above but any light source can be used as far as it can supply the white light.

The liquid crystal panel 300 controls the transmission/shielding of the light passing through the optical film 100 from the backlight source 200 according to the on/off voltage applied to the electrodes (not illustrated) provided in the liquid crystal panel 300. As shown in FIG. 1, the liquid crystal panel 300 mainly includes polarization films 301 and 311, glass substrates 303 and 309, a liquid crystal substance layer 305, and an optical filter 307. The liquid crystal panel 300 has the pixels aligned flatly and the electrodes (not illustrated) for applying a predetermined voltage to the respective pixels.

The polarization film 301 controls the polarization of the light passing through the optical film 100 and the polarization film 311 controls the polarization of the light coming out from the liquid crystal panel 300. In the polarization films 301 and 311, the direction of a polarization axis in each polarization film is determined according to the orientation of a liquid crystal substance used for the liquid crystal substance layer 305 described later.

Further, one or a plurality of retardation films for compensating the coloration in a voltage-applied state on the liquid crystal substance layer 305 described later may be provided between the polarization films 301 and 311 and the glass substrates 303 and 309 described later. As the retardation film, for example, an optical uniaxial film can be used. An angle formed by the polarization axis of each optical uniaxial film and the x-axis shown in FIG. 3 can be defined as a predetermined angle.

The glass substrates 303 and 309 are provided on and under the liquid crystal substance layer 305 described later, to support the liquid crystal substance forming the liquid crystal substance layer 305. The glass substrates 303 and 309 are formed of glass including a predetermined component. The electrodes (not illustrated) patterned by one of a predetermined metal and indium-tin oxide (ITO) are formed between the glass substrates 303 and 309 and the liquid crystal substance layer 305.

The surfaces of the glass substrates 303 and 309 may be subjected to what is called orientation processing in order to control the orientation of the liquid crystal substance forming the liquid crystal substance layer 305 described later. As an example of the orientation processing, for example, there are the processing (so-called rubbing processing) for forming an alignment film on the surfaces of the glass substrates 303 and 309 by using polyimide or the like before rubbing the formed thin film to the predetermined direction, and the processing for forming a photo-alignment film on the surfaces of the glass substrates 303 and 309 before irradiating there with the light of a predetermined wavelength. The orientation processing may be performed on the electrodes (not illustrated) formed on the surfaces of the glass substrates 303 and 309.

The liquid crystal substance layer 305 is a film formed of a predetermined liquid crystal substance. The liquid crystal substance forming the liquid crystal substance layer 305 is orientated in a predetermined direction. All the liquid crystal substances are not completely aligned in the same direction, but the respective liquid crystal substances are aligned in the predetermined direction on average. Hereinafter, the average orientation direction (more specifically, a unit vector showing the orientation direction on average) is referred to as a director.

The liquid crystal display device 10 according to the embodiment is preferably a liquid crystal display device of the VA mode in which the director of the liquid crystal substance in the liquid crystal substance layer 305 is substantially parallel with the vertical direction (the direction of the z-axis in FIG. 1). Further, the liquid crystal substance forming the liquid crystal substance layer 305 according to the embodiment is preferably a liquid crystal substance (a so-called liquid crystal substance having the negative dielectric anisotropy) having the dielectric constant in the direction of longitudinal axis smaller than the dielectric constant in the direction of short axis of molecule of the liquid crystal substance.

Each pixel forming the liquid crystal substance layer 305 may be alignment-divided into two or four regions (domains) of orientation in order to improve a viewing angle property not to deteriorate the display quality even when it is viewed obliquely. The orientation division of the liquid crystal substance layer 305 can be realized by forming each predetermined slit and each rib of a predetermined shape on the electrodes formed on the glass substrates 303 and 309.

The optical filter 307 is provided on the liquid crystal substance layer 305 (the positive side of the z-axis in FIG. 1) and works as a band-pass filter in a visible light band. The optical filter 307 is formed in a way that three kinds of microscopic color filters respectively passing the red light only, the green light only, and the blue light only are provided to be a predetermined plane arrangement configuration as shown in FIG. 1. The optical filter 307 is formed of pigment, colorant, and dye respectively absorbing the respective predetermined wavelength lights.

It is preferable that a scattering member such as a scattering filter of scattering the light passing through the optical film 100 is not provided between the optical film 100 and the liquid crystal panel 300. This is because when the scattering member is provided, the blue light passing through the optical film 100 and going in the wide-angle direction is scattered by the scattering member and it rarely goes in the wide-angle direction.

<Configuration of Optical Film 100>

With reference to FIG. 1 to FIG. 5, the configuration of the optical film 100 according to the embodiment will be described in detail.

The optical film 100 according to the embodiment primarily includes, for example, a base material 101, a colored layer 105, and a reflective layer 109, as shown in FIG. 1.

The base material 101 becomes a substrate of the optical film 100 and is formed of a strong material almost transparent in the visible light region and free from birefringence. Almost transparent in the visible light region means that the transmittance of the light is uniform in the whole wavelength region of about 360 nm to 830 nm and that the incident light is not scattered. When scattering occurs in the base material 101, it hinders the course of a ray from obliquely going and passing through the colored layer 105 described later, and it is difficult to obtain a predetermined hue correction. For example, acryl resin or plastic resin such as a triacetyl cellulose (TAC) film and a norbornene chemical film can be used for the base material 101. Any optional material that is almost transparent in the visible light region can be used other than the plastic resin.

The thickness of the base material 101 can be changed, according to the design condition of the liquid crystal display device 10 and the backlight source 200 with the optical film 100 according to the embodiment mounted there and it may be defined, for example, as about 1000 µm.

The colored layer 105 is formed on the surface 103 of the base material 101 at the side of the liquid crystal panel 300 and absorbs the light of a predetermined wavelength from the entered white light. The colored layer 105 is partially formed on the surface 103 with the thickness of, for example, about 2 µm. The colored layer 105 is preferably a blue pigment which has the maximum absorption wavelength, for example, in the band of more than 550 nm to less than 780 nm and strongly absorbs the light on a long wavelength side in the visible light band. The wavelength of 550 nm is not preferable because it is the wavelength close to the maximum luminosity function and the clearness of the liquid crystal display device is deteriorated according to the absorption of the light when using the pigment that absorbs a large amount of the light of this wavelength. On the other hand, when the maximum absorption wavelength is more than 780 nm, it is not preferable because it is difficult to absorb the light of the visible light band effectively. The maximum absorption wavelength of the pigment is more preferably, for example, 580 nm or more in order to absorb the light of yellow color and orange color effectively.

Such a pigment may be dye or colorant. As a specific example of the pigment, there are chemical compounds of xanthenes, squarylium, cyanine, oxonol, azo, pyrromethene, and porphyrin.

The area of a part with the colored layer 105 formed is preferably smaller than that of a part with no colored layer 105 formed. When the area of the part having the colored layer 105 is larger than that of the part with no colored layer formed, almost all the white lights passing through the optical film 100 are tinged with blue, and the front brightness of the liquid crystal display device 10 is rapidly reduced. Therefore, the area of the part with the colored layer 105 formed is preferably less than about 50% of the whole area of the surface 103.

The white light which enters the colored layer 105 obliquely and passes through the colored layer 105 is tinged with blue because the light of a predetermined wavelength band is absorbed by the pigment, forming the colored layer 105. The blue-tinged light going in the oblique direction enters the liquid crystal panel 300 and its hue becomes yellowish through the liquid crystal panel 300. As the result, the blue-tinged light entering the liquid crystal panel 300 comes out from the liquid crystal panel 300 as the white light. Therefore, when an observer sees the liquid crystal display device 10 from the wide-angle direction, he or she is to observe the white light.

The reflective layer 109 is provided on the surface 107 of the base material 101 at the side of the backlight source 200 and it scatters and reflects the white light supplied from the normal direction of the reflective layer 109 (namely, the side of the negative direction of the z-axis in FIG. 1). The reflective layer 109 is partially formed on the surface 107 in a way of overlapping with the colored layer 105 on the plane (namely, opposite to the colored layer 105). The reflective layer 109 can be formed of a diffuse reflection board using the white color paint and the thickness can foe fixed at about 2 µm.

Since the scattered and reflected white light by the reflective layer 109 is reflected at the side of the backlight source 200 again and enters the optical film 100, use efficiency of the light is not reduced.

The area of the part with the reflective layer 109 formed is preferably smaller than that of the part with no reflective layer 109 formed. When the area of the part having the reflective layer 109 is larger than that of the part with no reflective layer formed, the ratio of the white light entering the optical film 100 is reduced, thereby deteriorating the front brightness of the liquid crystal display device 10 suddenly. Therefore, the area of the part having the reflective layer 109 is preferably less than 50% of the whole area of the surface 107.

The area of the part with the reflective layer 109 formed is preferably larger than that of the part with the colored layer 105 formed. When the area of the part having the colored layer 105 is larger than that of the part having the reflective layer 109, the hue of the white light supplied from the normal direction of the optical film 100 (at the side of the negative direction of the z-axis in FIG. 1) changes to blue and the light passing through the liquid crystal panel 300 is tinged with blue, and it is not preferable.

<Specific Example of Colored Layer 105 and Reflective Layer 109>

Next, referring to FIG. 2A to FIG. 5, the specific example of the colored layer 105 and the reflective layer 109 according to the embodiment will be described in detail. FIG. 2A to FIG. 5 are views for explaining an example of the colored layer and the reflective layer according to the embodiment.

At first, with reference to FIG. 2A to FIG. 2C, a specific example of the colored layer 105 and the reflective layer 109 will be described in detail.

Figure 2A:
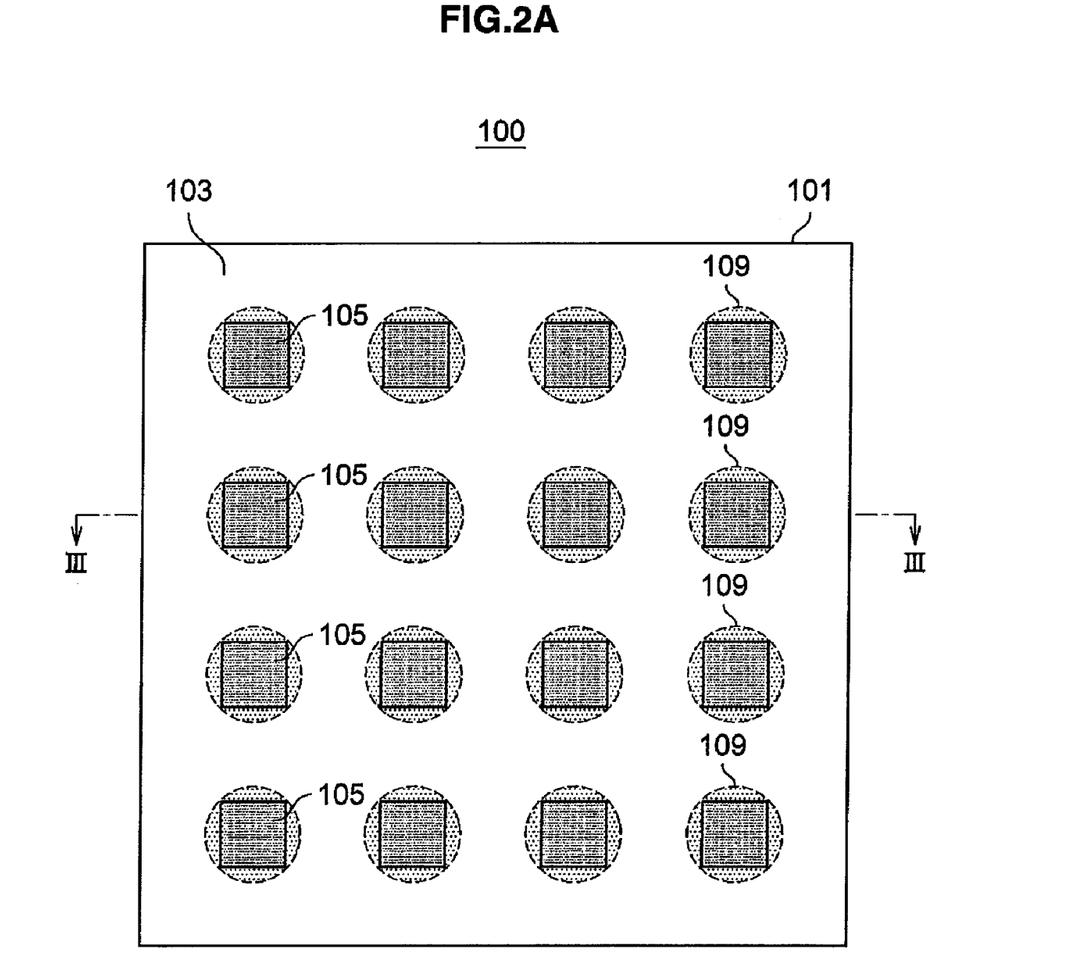
FIG. 2A is a view for explaining an example of a colored layer and a reflective layer according to the embodiment.

FIG. 2A shows a plane view when viewing the optical film 100 according to the embodiment from the side of the liquid crystal panel 300 (the side of the positive direction of the z-axis in FIG. 1). In FIG. 2A, the reflective layer 109 formed on the surface 107 on the side of the backlight source 200 is shown by a dotted line.

In the specific example, each colored layer 105 is formed on the surface 103 like an island and each reflective layer 109 is formed on the surface 107 like an island. Each colored layer 105 has a schematically rectangle shape and each reflective layer 109 has a schematically circle shape. Although the case where the respective shapes of the colored layer 105 and the reflective layer 109 are a square and a circle has been shown in the example shown in FIG. 2A, the shape of the colored layer 105 may be a rectangle and a polygon such as a pentagon and a hexagon, and the shape of the reflective layer 109 may be elliptical. The shape of the colored layer 105, however, is preferably a square, and the shape of the reflective layer 109 is preferably a circle. As shown in FIG. 2A and FIG. 2B, the diameter of one reflective layer 109 is the size large enough to include the colored layer 105, and the reflective layer 109 preferably has the diameter almost circumscribed with the corresponding colored layer 105.

The vertexes of the rectangle of the colored layer 105 are preferably arranged at the positions that do not agree with a polarizing plate absorption axis or transmission axis. The vertexes of the rectangle of the colored layer 105 are preferably arranged at the positions of about 45° from the polarizing plate absorption axis or the transmission axis. Therefore, the direction of each side of the rectangle of the colored layer 105 is arranged to be almost coincident with the direction of the polarizing plate absorption axis or the transmission axis, thereby making the vertexes of the rectangle of the colored layer 105 at the angle of about 45° from the polarizing plate absorption axis or the transmission axis.

Next, with reference to FIG. 2B and FIG. 3, the functions of the colored layer 105 and the reflective layer 109 according to the embodiment will be described in detail. FIG. 2B shows the one reflective layer 109 and the colored layer 105 provided at a position corresponding to this reflective layer 109 in an enlarged way and FIG. 3 is a cross-sectional view showing the optical film cut at the cut line shown in FIG. 2A.

Figure 2B:
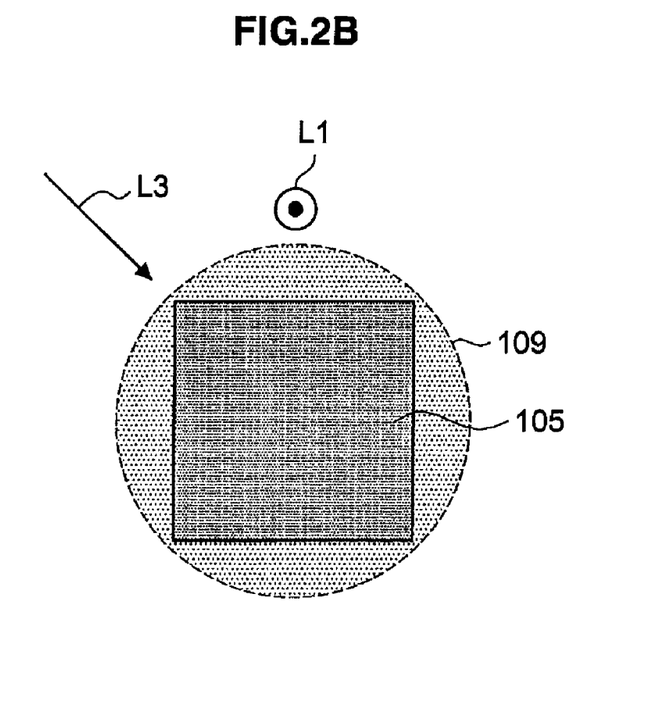
FIG. 2B is a view for explaining an example of the colored layer and the reflective layer according to the embodiment.
Figure 3:
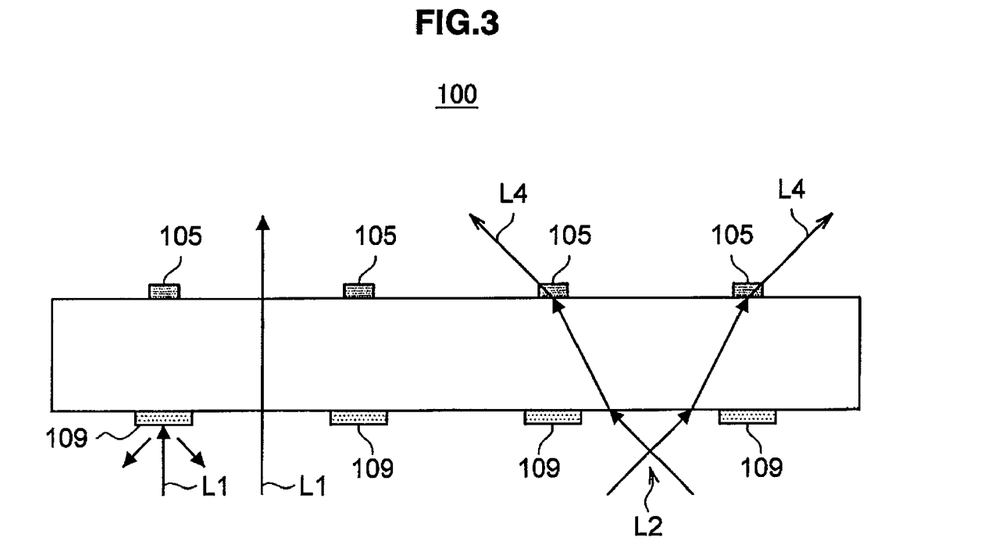
FIG. 3 is a view for explaining the colored layer and the reflective layer according to the embodiment.

When the colored layer 105 and the reflective layer 109 are formed as shown in FIG. 2B, the white light L1 vertically entering the reflective layer 109 is reflected by the reflective layer 109 and does not enter the colored layer 105, as shown in FIG. 3. The white light L1 entering the part with no reflective layer 109 formed passes through the optical film 100 as the white light without, passing through the colored layer 105.

As shown in FIG. 3, a part of the white light L2 entering the optical film 100 obliquely is refracted by the base material 101 and passes through the colored layer 105. The light for a predetermined wavelength band is absorbed in the colored layer 105 and it becomes a blue-tinged light (blue light) L4, hence to come out from the colored layer 105.

When the colored layer 105 and the reflective layer 109 are cut in a diagonal direction of the colored layer 105 in FIG. 2B, the width of the colored layer 105 is the same as the width of the reflective layer 109 in the diagonal line direction of the colored layer 105 (in other words, in the direction of an azimuth angle 45°). Therefore, the ratio that the white light L3 entered from the diagonal line direction of the colored layer 105 is reflected by the reflective layer 109 is reduced, and the ratio that the white light L3 passes through the colored layer 105 is increased. On the other hand, in the liquid crystal panel adopting the VA mode, it is known that a hue change is the largest when seeing the liquid, crystal panel from the direction of the azimuth angle 45°. In the example shown in FIG. 2A and FIG. 2B, since the white light L3 entered from the direction of the azimuth angle 45° passes through the colored layer 105 at a higher ratio, it is possible to correct a hue of the white light having a large hue change in the liquid crystal panel adopting the VA mode most effectively.

Although FIG. 2A shows 16 colored layers 105 and 16 reflective layers 109, the number of the colored layers 105 and the reflective layers 109 provided on the base material 101 is not limited to the example shown in the view. The colored layers 105 and the reflective layers 109 may be arranged as shown in FIG. 2A or may be arranged in a staggered shape. Although the colored layers 105 and the reflective layers 109 are arranged uniformly in FIG. 2A, the arrangement may be nonuniform.

Although the liquid crystal panel adopting the VA mode has been described as an example in FIG. 2A and FIG. 2B, it is possible to correct a hue in the liquid crystal panel adopting the IPS liquid crystal mode by providing the colored layers 105 and the reflective layers 109 shown in FIG. 2A and FIG. 2B. Further, it is also possible to correct a hue similarly in the liquid crystal panel adopting the TN liquid crystal mode by providing the colored layer 105 and the reflective layer 109, for example, as shown in FIG. 2C.

Figure 2C:
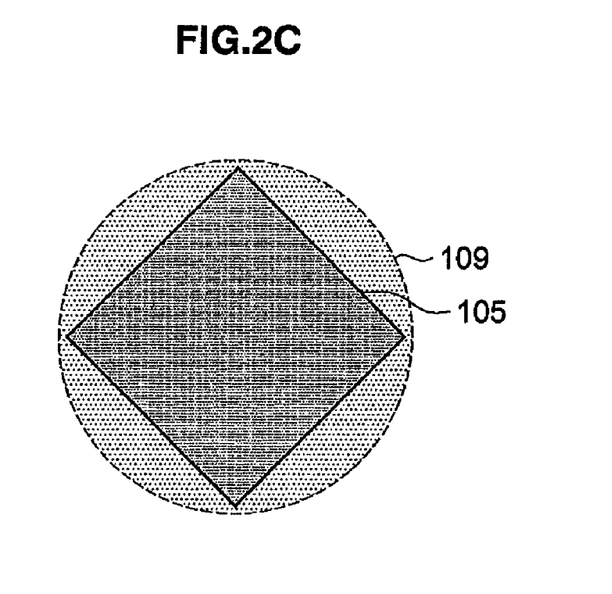
FIG. 2C is a view for explaining an example of the colored layer and the reflective layer according to the embodiment.

Although the case where the colored layer 105 and the reflective layer 109 have the different shapes has been described in FIG. 2A to FIG. 2C, the colored layer 105 and the reflective layer 109 may have the same shape such as schematic rectangular shape or schematic circular shape.

Figure 4:
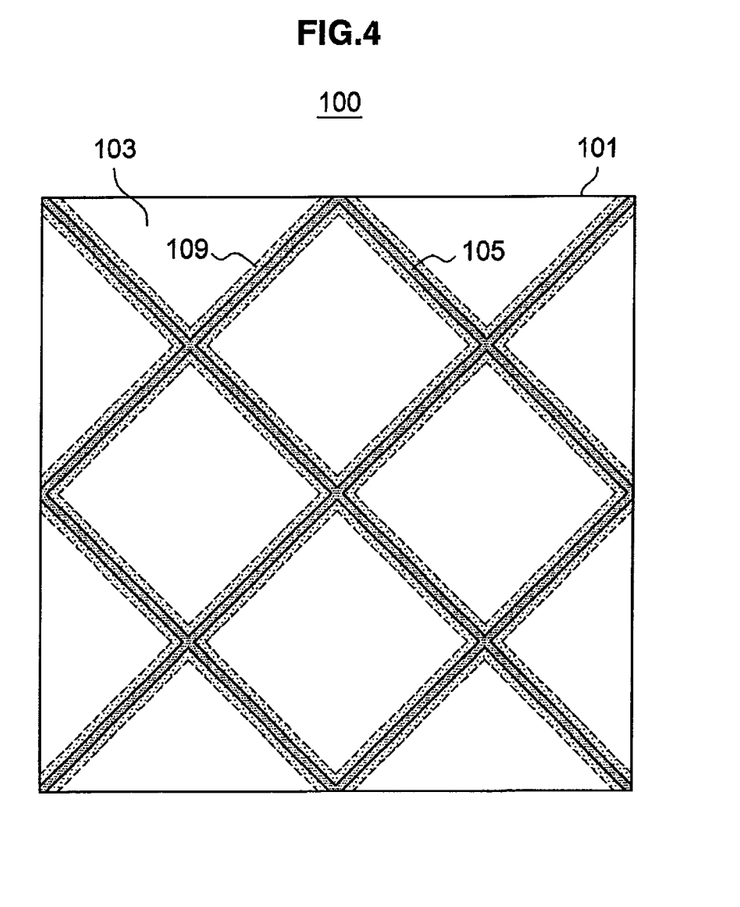
FIG. 4 is a view for explaining an example of the colored layer and the reflective layer according to the embodiment.

Referring to FIG. 4, another specific example of the colored layer 105 and the reflective layer 109 will be described in detail. In FIG. 4, the colored layer 105 is formed on the surface 103 in a grid shape obliquely crossing the edge side of the surface 103. In the same way, the reflective layer 109 is formed on the surface 107 in a grid shape obliquely crossing the edge side of the surface 107.

When cutting the base material 101 in parallel with the diagonal line of the base material 101, it is found that the width of the colored layer 105 is the same as the width of the reflective layer 109 shown in FIG. 4. Therefore, similarly to the colored layer 105 and the reflective layer 109 shown in FIG. 2A, the colored layer 105 and the reflective layer 109 shown in FIG. 4 can perform a hue-correction on the white light having the maximum hue change in the liquid crystal panel adopting the VA mode (namely, white light, entered from the direction of the azimuth angle 45°) most effectively.

Figure 5:
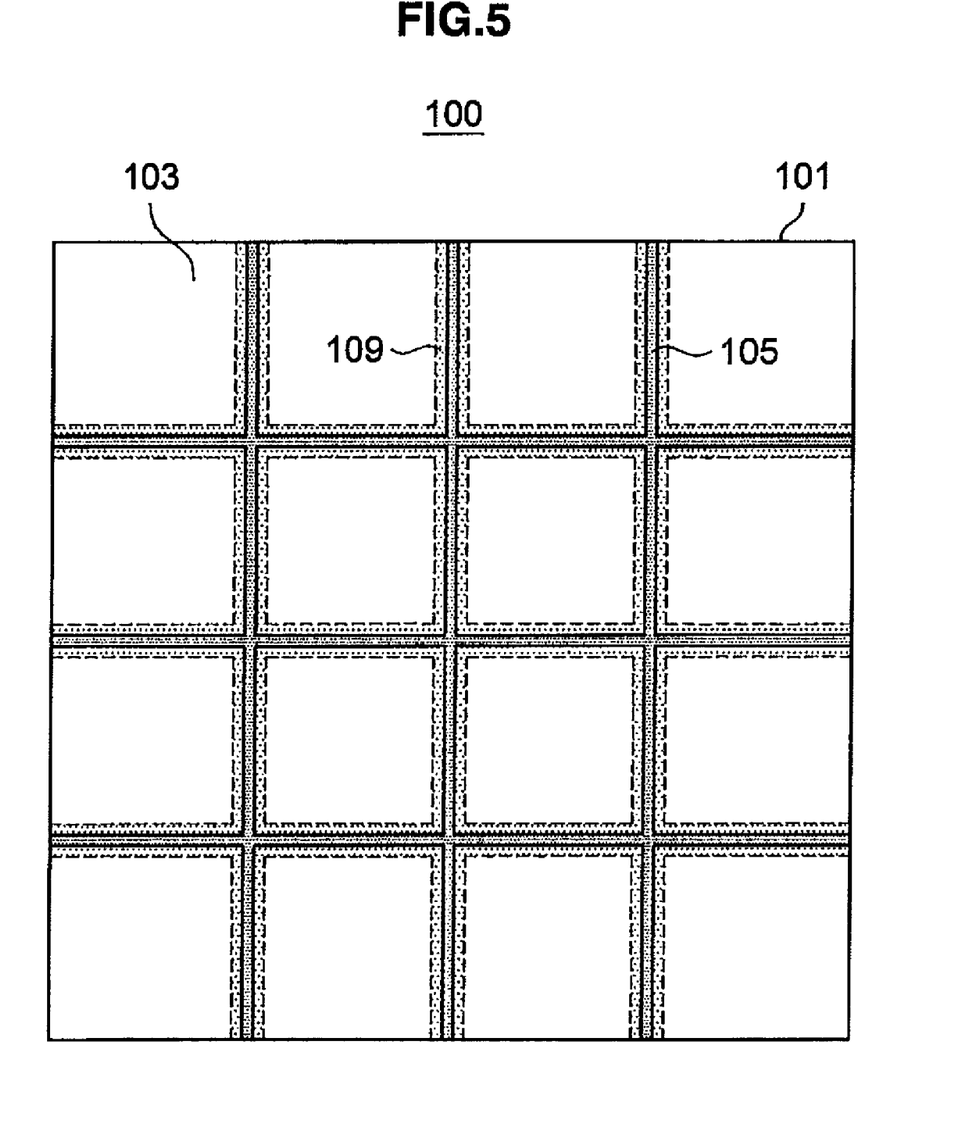
FIG. 5 is a view for explaining an example of the colored layer and the reflective layer according to the embodiment.
Figure 6:
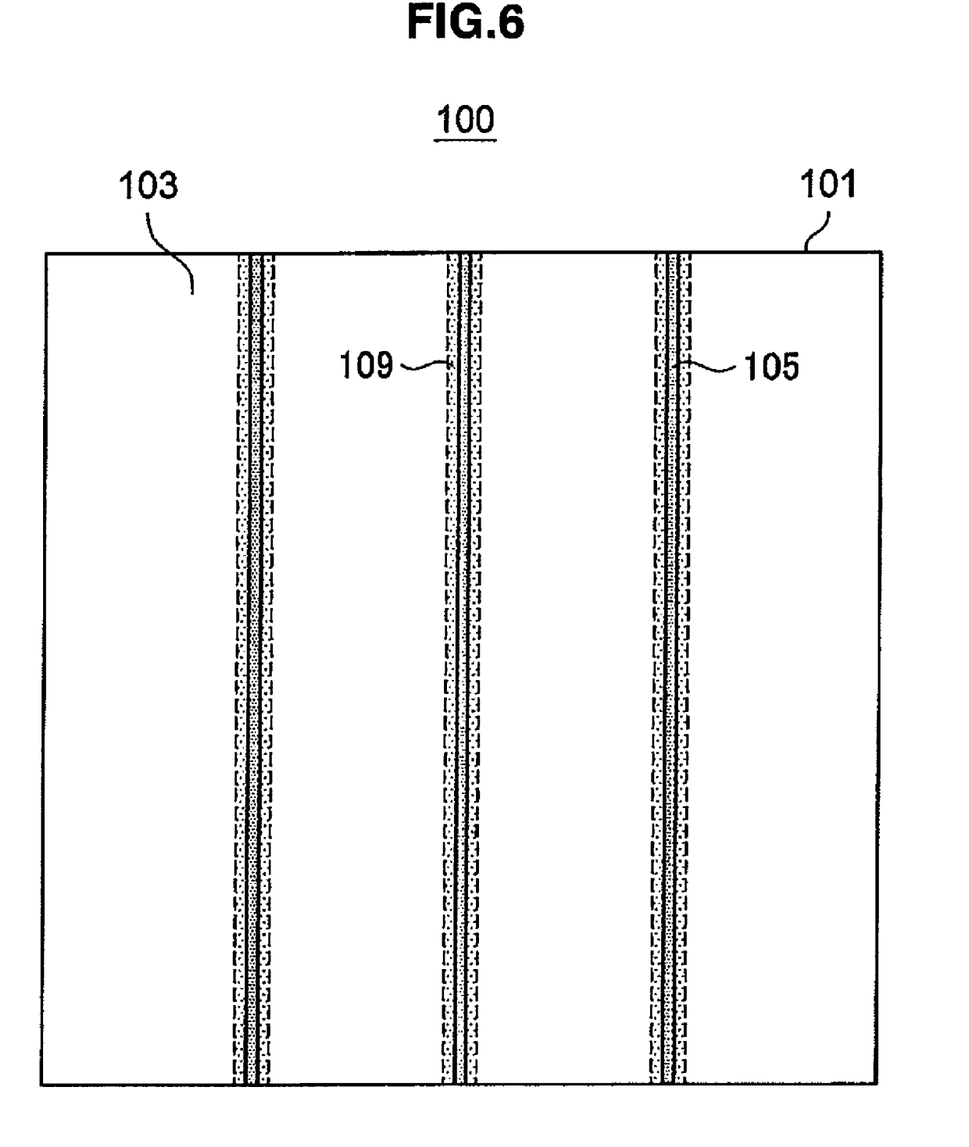
FIG. 6 is a view for explaining an example of the colored layer and the reflective layer according to the embodiment.

The colored layer 105 and the reflective layer 109 according to the embodiment may be formed on the substrate 101 in a grid shape as shown in FIG. 5 or in a stripe shape as shown in FIG. 6.

<Width of Colored Layer 105 and Reflective Layer 109>

Figure 7:
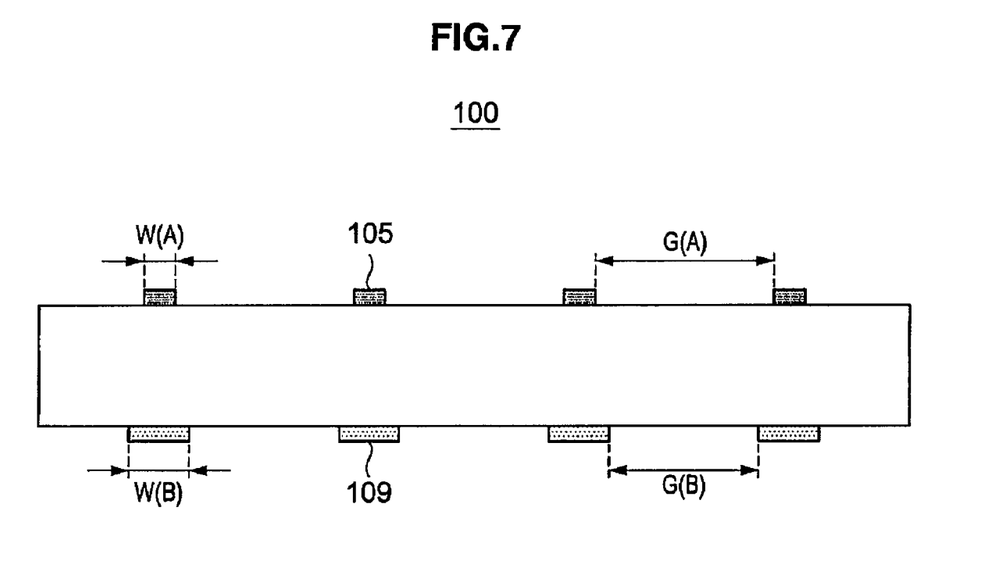
FIG. 7 is a view for explaining the colored layer and the reflective layer according to the embodiment.
Figure 8:
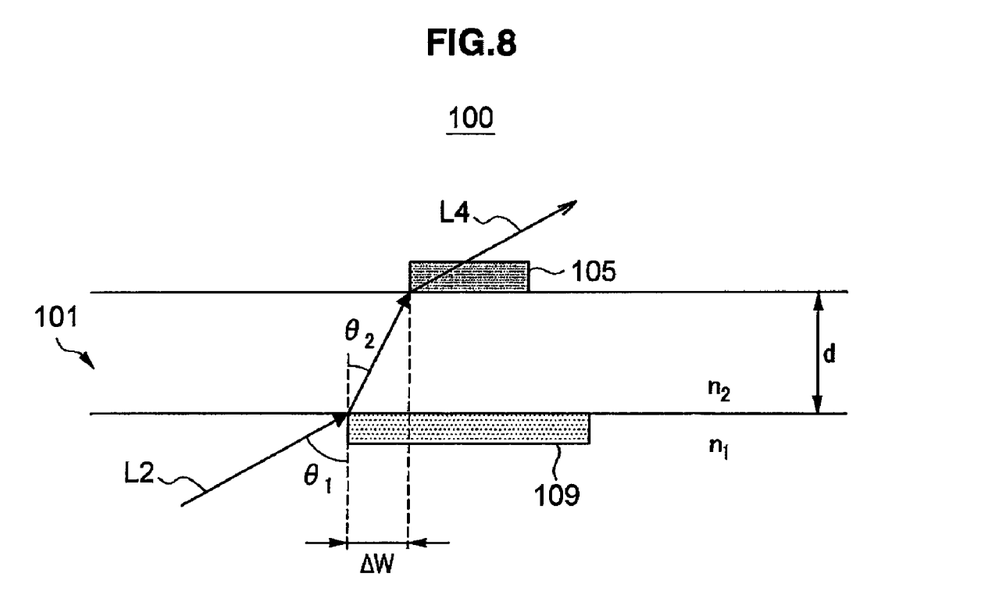
FIG. 8 is a view for explaining a deviation amount between the colored layer and the reflective layer according to the embodiment.

With reference to FIG. 7 and FIG. 8, the width of the colored layer 105 and the width of the reflective layer 109 will be described in detail. FIG. 7 is a view for explaining the colored layer and the reflective layer according to the embodiment. FIG. 8 is a view for explaining the deviation amount between the colored layer and the reflective layer according to the embodiment.

The width W(A) of the colored layer 105, the width G(A) between the neighboring colored layers 105, the width W(B) of the reflective layer 109, and the width G(B) between the neighboring reflective layers 109, according to the embodiment, can be determined according to the optical characteristics such as the refractive index of a material forming each of the colored layer 105 and the reflective layer 109, the optical characteristics of a material forming the base material 101, and the condition of mounting the optical film 100.

More specifically, the width W(A) of the colored layer 105 can be set based on the size of the base material 101 and the condition of mounting the optical film 100. When a deviation between the edge of the colored layer 105 and the edge of the reflective layer 109 is defined as $\Delta W$ as shown in FIG. 8, the maximum value of $\Delta W$, Max ($\Delta W$) can be determined as follows.

Here, as shown in FIG. 8, the refractive index of the part with the reflective layer 109 formed is defined as $n_1$ and the refractive index of the base material 101 is defined as $n_2$. The angle formed by the normal direction of the base material 101 and the incident light L2 is defined as $\theta_1$ and $\theta_2$ respectively and the thickness of the base material 101 is defined as d mm.

The Snell's rule shown in the following formula 1 is formed between the angles $\theta_1$ and $\theta_2$, and the relation shown in the following formula 2 is formed between $\Delta W$, d, and $\theta_2$. Therefore, the maximum value of $\Delta W$, Max ($\Delta W$) can be expressed as the formula 3. When the angle $\theta_2$ is expressed by the angle $\theta_1$ using the formula 1, the Max ($\Delta W$) becomes the value as shown in the following Table 1 according to d and $\theta_1$. Here, $n_1$ uses the refractive index of the air, 1.0 and $n_2$ uses the refractive index of an acrylic base material, 1.5.

$$n_1 \sin\theta_1 = n_2 \sin\theta_2 \qquad \text{(Formula 1)}$$

$$\tan\theta_2 = \frac{\Delta W}{d} \qquad \text{(Formula 2)}$$

$$\text{Max}(\Delta W) = d \times \tan\theta_2 \qquad \text{(Formula 3)}$$

|         | Incident Angle     |                    |                    |
|---------|--------------------|--------------------|--------------------|
| d (mm)  | $\theta_1 = 50°$   | $\theta_1 = 60°$   | $\theta_1 = 90°$   |
| 0.5     | 0.297              | 0.354              | 0.447              |
| 1.0     | 0.594              | 0.707              | 0.894              |
| 1.5     | 0.891              | 1.061              | 1.342              |
| 2.0     | 1.188              | 1.414              | 1.789              |

-continued

| d (mm) | Incident Angle | | |
|---|---|---|---|
| | $\theta_1 = 50°$ | $\theta_1 = 60°$ | $\theta_1 = 90°$ |
| 2.5 | 1.485 | 1.768 | 2.236 |
| 3.0 | 1.782 | 2.121 | 2.683 |
| 3.5 | 2.079 | 2.475 | 3.130 |
| 4.0 | 2.376 | 2.828 | 3.578 |
| 4.5 | 2.673 | 3.182 | 4.025 |
| 5.0 | 2.970 | 3.536 | 4.472 |
| 5.5 | 3.267 | 3.889 | 4.919 |
| 6.0 | 3.564 | 4.243 | 5.367 |
| 6.5 | 3.861 | 4.596 | 5.814 |
| 7.0 | 4.158 | 4.950 | 6.261 |
| 7.5 | 4.455 | 5.303 | 6.708 |
| 8.0 | 4.752 | 5.657 | 7.155 |
| 8.5 | 5.049 | 6.010 | 7.603 |
| 9.0 | 5.346 | 6.364 | 8.050 |
| 9.5 | 5.643 | 6.718 | 8.497 |
| 10.0 | 5.940 | 7.071 | 8.944 |

In this way, by determining the angle $\theta_1$ when a hue correction is most necessary, according to the polar angle dependence of the liquid crystal panel 300 with the optical film 100 applied and by taking into consideration the thickness of the base material 101 of the optical film 100, it is possible to determine the maximum value of the deviation between, the edge of the colored layer 105 and the edge of the reflective layer 109.

Any optional method that can realize a microscopic pattern can be used in order to form the colored layer 105 and the reflective layer 109 on the base material 101.

Although the ease where the optical film 100 according to the embodiment is independent of the backlight source 200 and the liquid crystal panel 300 has been described in the above, it is not limited to the example. The optical film 100 according to the embodiment may be formed integrally with the backlight source 200 and realized as the backlight source including the optical film 100 according to the embodiment. The optical film 100 according to the embodiment may be formed integrally with the liquid crystal panel 300 and realized as the liquid crystal panel 300 including the optical film 100 according to the embodiment.

Example

Next, in the liquid crystal display device 10 including the optical film 100 according to the embodiment, a simulation is performed on the front brightness and the color difference with the following conditions set. The color difference Δxy in observing the display from the polar angle 60° and the azimuth angle 45° is calculated as for the color difference.

Figure 9:
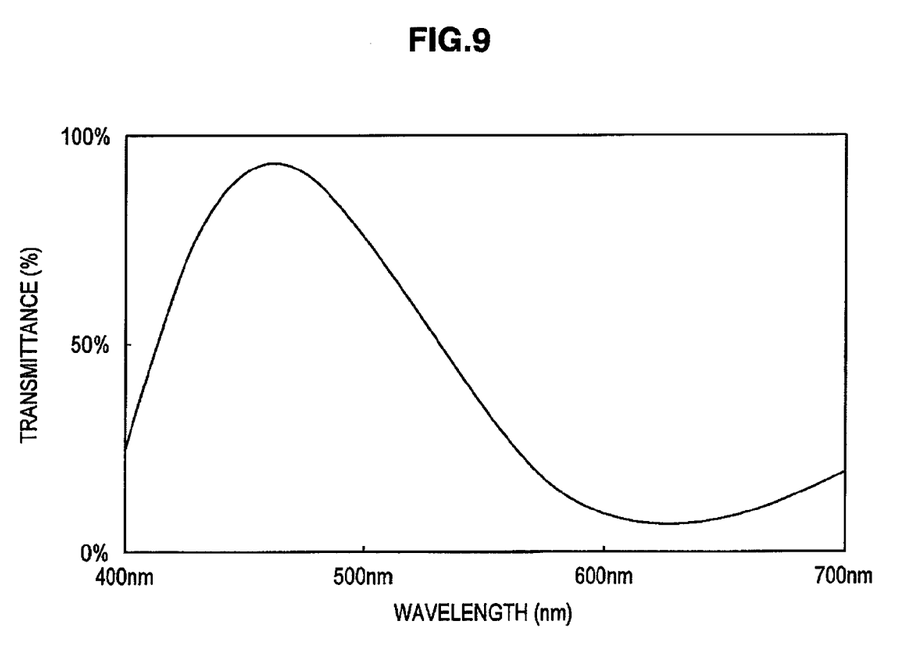
FIG. 9 is a spectrum showing an example of an absorption property of a blue pigment according to the embodiment.

At first, assume that the blue pigment has the maximum absorption wavelength about 620 nm as shown in FIG. 9 and that the colored layer 105 and the reflective layer 109 are formed on the base material 101 having the thickness of 1000 μm under the condition shown in the Table 2. At this time, the colored layer 105 and the reflective layer 109 have substantially circle shapes and formed on the base material 101 like islands.

As the conventional example, a simulation is similarly performed on the front brightness and the color difference in the liquid crystal display device when the optical film 100 according to the embodiment is not arranged.

As the result, it is found that the front brightness is reduced by 10 cd/m² compared with the conventional example, but that a hue change in the oblique direction (deviation observed from the front) can be reduced to half or less of the conventional example, as shown in the Table 2.

| Set Value (μm) | | Conventional Example | Example |
|---|---|---|---|
| Colored Layer | G(A) | — | 1000 |
| | W(A) | — | 200 |
| | Pitch(A) | — | 1200 |
| Reflective Layer | G(A) | — | 900 |
| | W(A) | — | 300 |
| | Pitch(A) | — | 1200 |
| Front Brightness (cd/m²) | | 500 | 490 |
| Hue Change in the Oblique Direction | | 0.060 | 0.024 |

In this way, by using the optical film 100 according to the embodiment, it is possible to inhibit a hue change extremely when it is observed in the white display from the wide-angle.

Although the case where the colored layer 105 and the reflective layer 109 are overlapped uniformly has been described in the above-mentioned embodiment, the colored layer 105 may be provided at a position deviated to one edge of the reflective layer 109 according to the arrangement position of the base material 101.

The present application contains subject matter related to that disclosed in Japanese Priority Patent Application JP 2008-098611 filed in the Japan Patent Office on Apr. 4, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
a liquid crystal panel;
a backlight source which irradiates the liquid crystal panel with white light, provided in a rear side of the liquid crystal panel; and
an optical film which is provided between the liquid crystal panel and the backlight source, wherein
the optical film includes
a base material which passes the white light irradiated from the backlight source,
a colored layer which is partially provided on one surface of the base material at a side of the liquid crystal panel, and
a reflective layer which reflects the white light, provided on another surface of the base material at a side of the backlight source opposite to the colored layer, wherein
the reflective layer entirely overlaps the colored layer.

2. The liquid crystal display device according to claim 1, wherein
an area of a part of the base material with the colored layer formed is smaller than an area of a part with no colored layer formed.

3. The liquid crystal display device according to claim 1, wherein
an area of a part of the base material with the reflective layer formed is smaller than an area of a part with no reflective layer formed.

4. The liquid crystal display device according to claim 1, wherein an area of a part of the base material with the colored layer formed is smaller than an area of a part of the base material with the reflective layer formed.

5. The liquid crystal display device according to claim 1, wherein
the colored layer is formed of a chemical compound having a maximum absorption wavelength in a visible light region of 580 nm and more.

6. The liquid crystal display device according to claim 1, wherein
a plurality of the colored layers is provided like islands with each in a schematically rectangular shape, and
a plurality of the reflective layers is provided like islands with each in a schematically circular shape larger than the corresponding colored layer.

7. The liquid crystal display device according to claim 1, wherein
the colored layer and the reflective layer are provided on the base material in a grid shape.

8. The liquid crystal display device according to claim 7, wherein
the colored layer and the reflective layer are oblique to each edge side of the base material.

9. The liquid crystal display device according to claim 1, wherein
the colored layer and the reflective layer are provided on the base material in a stripe shape.

10. The liquid crystal display device according to claim 1, wherein
a scattering member which scatters the light passing through the optical film does not exist between the optical film and the liquid crystal panel.

11. A backlight source assembly comprising:
a backlight source which emits white light; and
an optical film which is provided on the backlight source, wherein
the optical film includes
a base material which passes the white light emitted from the backlight source,
a reflective layer which reflects the white light, partially provided on one surface of the base material at a side of the backlight source, and
a colored layer which is provided on another surface opposite to the side of the backlight source, in a way of facing the reflective layer, wherein
the reflective layer entirely overlaps the colored layer.

12. An optical film comprising:
a base material which passes white light;
a reflective layer which reflects the white light, partially provided on one surface of the base material; and
a colored layer which is provided on another surface of the base material opposite to the reflective layer, wherein
the reflective layer entirely overlaps the colored layer.

* * * * *